United States Patent [19]
Kupper et al.

[11] Patent Number: 5,437,721
[45] Date of Patent: Aug. 1, 1995

[54] METHOD OF PRODUCING CEMENT CLINKER

[75] Inventors: Detlev Kupper, Telgte; Wolfgang Rother, Oelde, both of Germany

[73] Assignee: Krupp Polysius AG, Beckum, Germany

[21] Appl. No.: 255,126

[22] Filed: Jun. 7, 1994

Related U.S. Application Data

[63] Continuation of Ser. No. 71,079, Jun. 2, 1993, abandoned.

[30] Foreign Application Priority Data

Jun. 16, 1992 [DE] Germany .......................... 42 19 697.3

[51] Int. Cl.$^6$ .............................................. C04B 7/43
[52] U.S. Cl. ..................................... 106/739; 106/744; 106/752
[58] Field of Search ............... 106/739, 740, 744, 749, 106/752, 753, 759

[56] References Cited

U.S. PATENT DOCUMENTS 4,402,754  9/1983  Schmidt et al. ...................... 106/744
4,507,153  3/1985  Herchunbach et al. .............. 106/744

FOREIGN PATENT DOCUMENTS 3237343  4/1984  Germany .

OTHER PUBLICATIONS

"The Manufacture of Portland Cement Clinker in a Spouting Bed" Heertjes et al. (1971) *Powder Technology* vol. 11, No. 5 pp. 269–274.

*Primary Examiner*—Mark L. Bell
*Assistant Examiner*—Paul Marcantoni
*Attorney, Agent, or Firm*—Learman & McCulloch

[57] ABSTRACT

The invention relates to a method of producing cement clinker from fine-grained cement raw material which after preheating and calcining is burnt in a clinker burning zone divided into two stages and is then cooled. Optimum process conditions, particularly in the clinker burning zone, are achieved in that the calcined material is first of all heated to a temperature up to the region of the sintering temperature in a stage formed by a fluidized bed or spouted bed so that a build-up granulation of the material is brought about, whereupon the material thus heated is heated to the sintering temperature in a second stage of the clinker burning zone which acts as the finish-burning stage and tempered to the finishing burn.

12 Claims, 1 Drawing Sheet

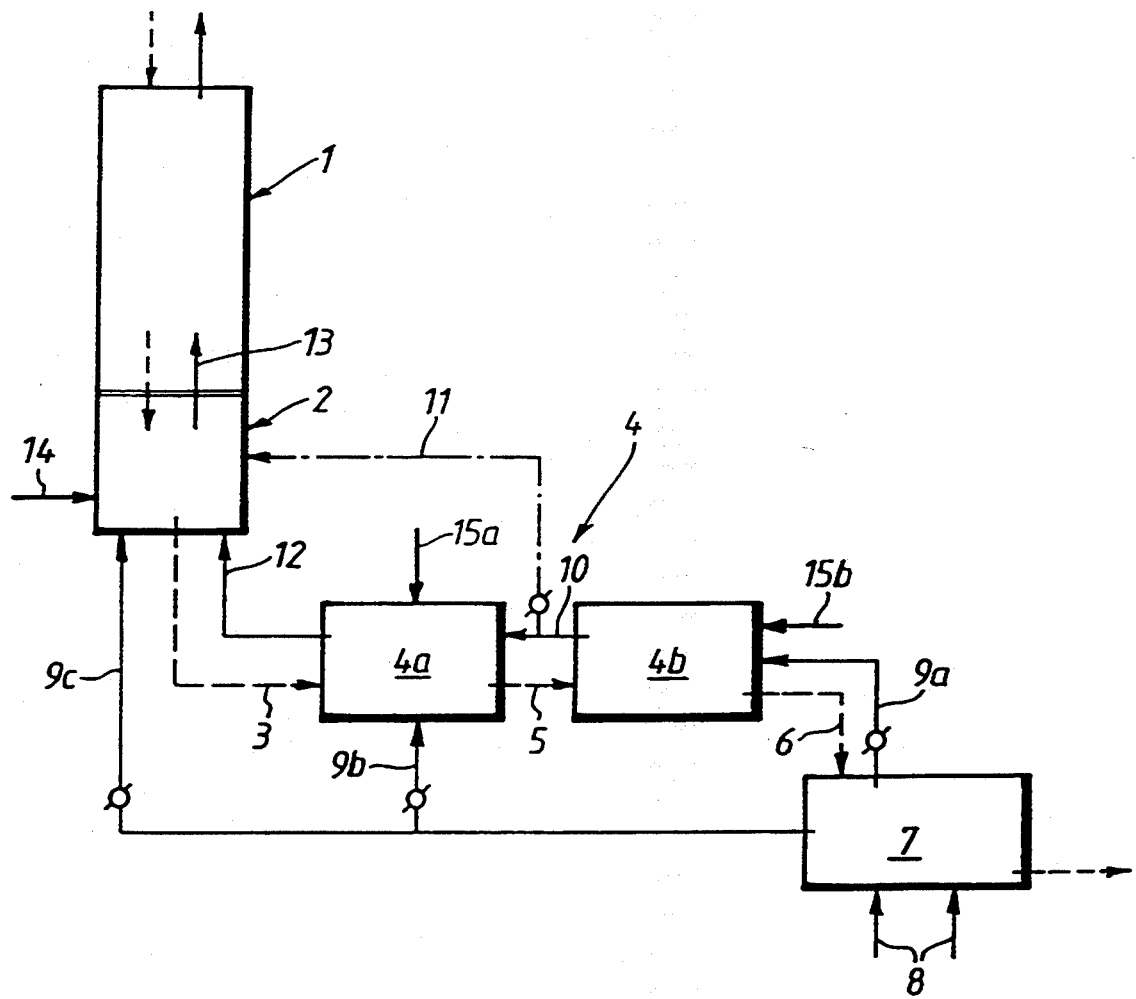

METHOD OF PRODUCING CEMENT CLINKER

This is a continuation of copending application Ser. No. 08/071,079 filed on Jun. 2, 1993, now abandoned.

The invention relates to a method of producing cement clinker from fine-grained cement raw material.

BACKGROUND OF THE INVENTION

Methods of producing cement clinker in which a thermal secondary treatment of largely calcined raw material takes place before the actual combustion stage are known in various forms. In one of these known methods (DE-OS-32 37 343) a special heating unit for the calcined material is arranged between the calcining zone and the final combustion zone. In this heating unit the quantity of heat required for rapid heating of the material should be released in measured amounts by setting an adapted heat performance by means of a plurality of fuel supplies distributed over the heating unit. As a result the calcined material should be heated to the temperature at which elite formation begins, which can be on average about 1250° C., but without a temperature occurring in only a part of the stream of material for burning which would facilitate the formation of quantities of melt. One possible type of construction of the heating unit which is indicated is the use of a fluidised bed reactor with overflowing fluidised bed; however, a heating unit is preferred which is constructed as a substantially vertical shaft-like suspension reactor. If with this known method the heating unit is provided—as mentioned—with an extremely large quantity of fuel and/or air supply points, then this results in extremely complicated adjustment for the desired homogeneous temperature profile if undesirable melt formation is to be avoided.

The object of the invention is to make further improvements to conventional cement clinker process with a relatively simple construction and operation wherein rapid heating of previously calcined material and spontaneous heat compensation between the material and the treatment gas in the first stage of the clinker burning zone is ensured as well as a particularly easily controllable clinker finishing burn of the heated material in the second stage.

SUMMARY OF THE INVENTION

In this method according to the invention for producing cement clinker from fine-grained cement raw material, the heating of the calcined material takes place in the first stage of the clinker burning zone (heating stage) in a fluidised bed or a spouted bed to a temperature near but lower than the sintering temperature. During this heating of the calcined material a build-up granulation, or partial agglomeration of this material is simultaneously brought about by a swirling or circulating motion of the material in this heating stage. The material thus heated is then heated to the necessary sintering temperature in the second stage of the clinker burning zone which acts as the finish-burning stage and tempered until the finishing burn. In this case the build-up granulation previously brought about in the heating stage has a favourable effect in so far as the solid reactions necessary for the clinker formation are already able to take place—at least to a large extent—in the heating stage, and these solid reactions then react further in the subsequent finish-burning stage to finish burning of the clinker.

According to the inventive method, it is also particularly advantageous if the heating and the build-up granulation of the calcined material is carried out in a spouted bed operated with at least approximately the action of an agitator vessel. Whereas in a conventional fluidised bed an inlet base with a large surface area provides for a homogeneous gasification and thus fluidisation of the entire fluidised bed, in a spouted bed or in such a spouted bed reactor the inlet base is drawn together over a cone to form a nozzle so that an internal material circulation can be achieved with the aid of an upwardly directed gas stream in such a spouted bed or spouted bed reactor, since the solid material to a large extent falls back in the direction of the nozzle with greater density in an annular zone around an upward stream and is then accelerated upwards again. In this case an internal gas recirculation also occurs in the spouted bed or in the appertaining reactor. In this way an at least approximately or almost ideal agitator vessel action is produced, which layouts the internal material and gas circulation and thus particularly favourable flow and mixing conditions occur in the appertaining reactor which cause a spontaneous heat compensation of the material and treatment gas. In contrast to the known construction described above with the multiple division of fuel and combustion air, in the method according to the invention it is possible with a simple and specific supply of fuel in the spouted bed or in the appertaining reactor to set a temperature exactly which lies below the critical temperature for this spouted bed at which operation of the plant is endangered by the formation of coatings of raw material on the reactor walls or the like.

For the production of clinker minerals an intimate contact between particles, i.e. granulation, is necessary. In the method according to the invention—as mentioned—a build-up granulation of the calcined material takes place in an advantageous manner when this material is being heated in the heating stage, so that here the commencement of the clinker formation is already undertaken in the fluidised bed or preferably in the spouted bed, which is more efficient than in the subsequent finish-burning stage of the clinker burning zone. In this case—in contrast to the known method according to DE-OS-32 37 343 described above, according to which a formation of melt in the heating unit should be avoided as undesirable—from the internal circulation in the spouted bed a melt formation is deliberately utilised for the build-up granulation in the dense material concentration, and this internal circulation also simultaneously produces a certain self-cleaning effect for the inner wall of the appertaining reactor. Furthermore, the aforementioned agitator vessel action in this spouted bed produces a uniform reaction temperature which is simple to adjust.

In the foregoing connection it should generally be mentioned that the formation of clinker minerals at sintering temperature is associated with the occurrence of the so-called clinker melt. Depending upon the chemical composition of the raw material and the temperature a melt content of approximately 22 to 27% is normally produced, e.g. in the case of Portland cement clinker, which in addition to an acceleration of reaction also causes the aforementioned granulation of the clinker. In the spouted bed used according to the invention for the heating stage the reaction temperature can be set to a certain extent as the "pre-sintering temperature", which irrespective of the constituent minerals of clinker in the material permits a melt content or liquid percentage of for example 5 to 7% or even somewhat more, affecting the build-up granulation of the calcined material in the heating stage and accelerating the solid state reactions without it being possible for clogging to occur or for undesirable large agglomerates to be formed.

If required, the described build-up granulation of the calcined material in the heating stage can also be controlled by delivered quantities of seed clinker to this heating stage (first stage of the clinker burning zone). As seed clinker a fraction of approximately 1 to 3 mm mesh size screened out of the clinker production can preferably be used or, in the start-up state of the appertaining production plant a clinker fraction suitably produced externally can be used.

It is known that during the combustion process in the clinker burning zone alite ($C_3S$) is formed, which is a principal vehicle for the hydraulic properties and the strength of cement, and principally during sintering from belite ($C_2S$) and lime (CaO) produced in earlier reactions. For finish burning of the clinker an appropriate sintering temperature and an appropriate residence time are necessary until all of the free lime is almost consumed. In this method according to the invention the fluidised or spouted bed should be operated, irrespective of the rate of alite formation, at an operating temperature at which—as already explained above to some extent—a first formation of melt occurs which causes a granulation of the material to clinker and thus certainly also causes a forced alite formation. This is effected by the circulation explained above and by the high density of the material particularly in the spouted bed. The operating temperature or sintering temperature can be held at the optimum point depending upon the material so that no coatings of material can occur on the inner wall of the appertaining reactor.

In this method according to the invention the finish burning takes place in the finish burning stage (second stage of the clinker burning zone), preferably at a temperature of at least approximately 1300° C., particularly preferably at approximately 1310° to 1370° C., depending in each case upon the chemical composition, the geological genesis and the mechanical preparation of the raw material. The heated material is preferably burnt to a free lime content of <1% in this finish burning stage.

In critical cases the calcined material can also already be heated to approximately the sintering temperature in the heating stage of the clinker burning zone, that is to say in the fluidised bed or preferably in the spouted bed. In the subsequent finish-burning stage of the clinker burning zone it is then merely necessary to ensure the necessary sintering temperature for any residual heating, whilst in the main this second stage of the clinker burning zone also has the task of facilitating the necessary residence time for the clinker mineral formation, so that then under particularly favourable conditions an adiabatic tempering of the material which has been brought to sintering temperature is carried out in this finish-burning stage.

THE DRAWING

This method according to the invention will be explained below in greater detail with the aid of a simplified example of the plant which is illustrated as a simple flow diagram in the accompanying drawing.

DETAILED DESCRIPTION

In this plant which is constructed for carrying out the method according to the invention and thus for producing cement clinker from fine-grained cement raw material, the cement raw material is first of all preheated in a suitable preheater (particularly a suspension or cyclone preheater) 1 and is then largely or almost completely calcined in a conventional calciner 2 which forms a calcining zone. The calcined material (broken arrow 3) is then delivered to a clinker burning zone 4 which is divided into two stages and is composed of a fluidised bed or spouted bed reactor 4a which forms a heating stage (first stage) and a finish-burning reactor 4b which forms a finish-burning stage (second stage). Accordingly the calcined material (arrow 3) is first delivered to the reactor 4a, which is preferably constructed as a spouted bed reactor and in which the calcined material is heated to a temperature up to the region of the sintering temperature, and a build-up granulation of the material is brought about—as explained above—during this heating. The material which is thus heated and at least partially agglomerated and granulated is then introduced—according to the broken arrow 5—into the finish-burning reactor 4b in which—in so far as it is still necessary—it is heated to the necessary sintering temperature and tempered to the finishing burn.

The hot clinker leaving the finish-burning reactor 4b is then—as shown by the broken arrow 6—cooled in a suitable cooler (cooling zone) 7, preferably with the aid of delivered cooling air (solid arrows 8).

The heated air or hot air produced—by heat exchange—in this cooling of the hot clinker is delivered as additional combustion air in adjustable quantities in each case—according to the solid lines or arrows 9a, 9b and 9c—to the finish-burning reactor (finish-burning stage) 4b, the fluidised or spouted bed reactor (heating stage) 4a and the calciner (calcining zone) 2. Furthermore, the exit gases from the finish-burning reactor 4b can be delivered to the fluidised or spouted bed reactor 4a (according to the solid arrow 10) to aid heating thereof; a proportion of these exit gases from the finish-burning reactor 4b can also optionally be delivered—as indicated by a broken line or a broken arrow 11—to the calciner 2 (bypassing the reactor 4a). Furthermore, the exit gases from the fluidised or spouted bed reactor 4a are also delivered to this calciner 2. The exit gases (arrow 13) from this calciner 2, or at least the greater proportion of these exit gases, are then utilised in the usual way for preheating the raw material in the preheater A corresponding proportion of a suitable fuel is also delivered in the usual way to the calciner 2, as indicated by the arrow 14.

Additional fuel must also be delivered to the clinker burning zone 4 in order to be able to set the temperatures necessary in each case quite accurately in the two stages 4a, 4b. In this case according to the invention approximately 80 to 90% of the fuel intended for the entire clinker burning zone 4 is used—according to the arrow 15a—in the fluidised or spouted bed of the reactor 4a and—according to the arrow 15b—approximately the remaining 10 to 20% is used in the finish-burning stage, that is to say in the finish-burning reactor 4b.

The reactor 4b for the finish-burning stage can preferably be constructed as a relatively short rotary kiln which operates with a counter-current between material and gas, is if required thickly insulated and lined and can be operated with relatively high or higher material filling ratios by comparison with conventional rotary kilns.

Using this type of clinker burning clear advantages can be achieved by comparison with the generally one-stage clinker burning zone or the one-stage rotary kilns used for this which have usually been used in the past; for example:

an extremely low $NO_x$ formation in the first stage (heating stage of the clinker burning zone) which is preferably formed by a spouted bed reactor 4a with approximately the action of an agitator vessel. First studies have shown that the $NO_x$ emission can be reduced by approximately 70% with reference to the $NO_x$ formation in the conventional one-stage rotary kiln, whereas in a general plant with a calciner in which the $NO_x$ formation has already been reduced by 50% during calcining it can still be reduced by approximately 50%.

Because of the agitator vessel action explained above in the heating stage of the clinker burning zone formed by a spouted bed reactor 4a, temperature peaks are avoided for the material to be treated, which makes possible specific influencing of the adhesive forces on the material surface (in order to bring about the desired build-up granulation).

A greater fuel flexibility is facilitated, particularly in the reactor 4a which forms the heating zone, by combustion in the fluidised bed or—preferably—in a spouted bed. Maxima such as occur nowadays in a rotary kiln are not necessary in this reactor 4a. As a result low-grade fuels of low calorific value as well as fuels with a high moisture content are used very widely not only the calcining zone (calciner 2) but also in the subsequent reactors.

Furthermore, using this mode of operation of the clinker burning zone 4 it is also possible to a large extent to provide a separate fuel preparation by means of gasification and/or degasification particularly for the reactor 4a of the heating zone.

By means of bench tests and mathematical derivations it is also possible in a simple manner to produce exact dimensions for the two reactors 4a and 4b provided for the heating stage and the finish-burning stage of the clinker burning zone 4—related to the material and the fuel.

By the use of a fluidised bed or spouted bed for heating the calcined material in the first stage of the clinker burning zone 4, the quantity of rotating masses is also considerably reduced—by comparison with a convention one-stage clinker burning zone which is formed by a one-stage rotary kiln—so that the refractory lining has a longer service life and lower radiation losses can be brought about by thicker brickwork.

Furthermore, in this method according to the invention undesirable volatile components can if required be drawn off selectively from a gas stream by at least one bypass in the region of the clinker burning zone. Thus with the two-stage construction of the clinker burning zone 4 it is possible for example for volatile chlorine compounds to be drawn off selectively in the bypass from the exit gases (arrow 12) from the first stage of the clinker burning zone 4, that is to say from the reactor 4a, as a partial gas discharge. On the other hand, volatile sulphur compounds are preferably selectively drawn off in the bypass from the exit gases (arrow 10) from the finish-burning stage of the clinker burning zone 4, that is to say from the reactor 4b. As a result the total bypass quantity can be considerably reduced by comparison with known constructions.

Thus the alkali reduction in the clinker which is often required to meet quality standards can be specifically controlled as a function of the chemical composition of the raw material and the fuel. Depending upon whether alkali chlorides or alkali sulphates are predominantly present in the gas phase from the proportion of materials, the bypass gas stream is drawn off from the relevant exit gas stream from the stages 4a and 4b.

Thus these possibilities for discharging undesirable volatile constituents allow an extremely good control of the finished product quality and thus specific influencing of the content in the clinker of this volatile constituent.

We claim:

1. A method of producing cement clinker from granular raw material having a sintering temperature characteristic of the raw material being treated, said method comprising the steps of:
    preheating the raw material in a preheating zone;
    at least partially calcining the preheated material in a calcining zone;
    heating the partially calcined material in a first stage of a clinker burning zone to a temperature approaching but lower than the sintering temperature while agitating said partially calcined material sufficient to produce only a partial agglomeration of the material;
    further heating the material in a second stage of the clinker burning zone to the sintering temperature to produce cement clinker; and
    cooling the cement clinker in a cooling zone.

2. The method of claim 1 wherein the agitation is effected by passing the partially calcined material through a spouted bed reactor.

3. The method of claim 1 including introducing seed clinker into the first stage of the clinker burning zone.

4. The method of claim 1 wherein the material is heated in the second stage to at least 1300° C.

5. The method of claim 4 wherein the material is heated to between 1310° C. and 1370° C.

6. The method of claim 1 wherein the material is burnt in the second stage of the clinker burning zone to a free lime content of less than 1%.

7. The method of claim 1 wherein about 80 to 90% of a total quantity of fuel delivered to the clinker burning zone is utilized in the first stage and the remaining 10 to 20% is utilized in the second stage.

8. The method of claim 1 including generating exhaust gases containing undesirable volatile alkali constituents in said clinker burning zone and selectively withdrawing at least some of the volatile constituents from such exhaust gases of the clinker burning zone.

9. The method of claim 8 wherein the volatile constituents include chlorine compounds which are withdrawn from exhaust gases exiting the first stage.

10. The method of claim 8 wherein the volatile constituents include sulphate compounds which are withdrawn from exhaust gases exiting the second stage.

11. The method of claim 1 wherein the second stage comprises a rotary kiln and the material is delivered through the rotary kiln contra to the direction of gas flow through the rotary kiln.

12. The method of claim 1 wherein air is introduced into the cooling zone to cool the cement clinker causing the air to be heated and delivering the heated air to at least one of the first stage of the clinker burning zone, the second stage of the clinker burning zone, and the calcining zone.

* * * * *